(12) United States Patent
Neagu et al.

(10) Patent No.: US 10,382,518 B2
(45) Date of Patent: Aug. 13, 2019

(54) LOW LATENCY APPLICATIONS USING MULTIPLE SERVERS

(71) Applicant: Google LLC, Mountain View, CA (US)

(72) Inventors: Dorina Mariana Neagu, Mountain View, CA (US); Sigurdur Sveinn Simonarson, San Jose, CA (US); Mohammad Nayyar Azam, Fremont, CA (US)

(73) Assignee: Google LLC, Mountain View, CA (US)

( * ) Notice: Subject to any disclaimer, the term of this patent is extended or adjusted under 35 U.S.C. 154(b) by 184 days.

(21) Appl. No.: 15/236,804

(22) Filed: Aug. 15, 2016

(65) Prior Publication Data

US 2017/0279869 A1 Sep. 28, 2017

Related U.S. Application Data

(60) Provisional application No. 62/311,827, filed on Mar. 22, 2016.

(51) Int. Cl.
*H04L 29/08* (2006.01)
*H04L 12/24* (2006.01)
(Continued)

(52) U.S. Cl.
CPC .............. *H04L 67/02* (2013.01); *G06F 9/451* (2018.02); *G06F 9/54* (2013.01); *G06F 16/986* (2019.01);
(Continued)

(58) Field of Classification Search
CPC ......... H04L 67/00–67/42; H04L 41/00–41/50; G06F 16/986; G06F 9/448–9/54
See application file for complete search history.

(56) References Cited

U.S. PATENT DOCUMENTS 6,539,435 B2 * 3/2003 Bolmarcich ............ G06F 9/546
718/107
8,799,889 B2 8/2014 Jones et al.
(Continued)

FOREIGN PATENT DOCUMENTS

JP H 06259115 9/1994
JP 2002142240 5/2002
(Continued)

OTHER PUBLICATIONS

International Search Report and Written Opinion in International Application No. PCT/US2016/048423, dated Dec. 6, 2016, 15 pages.
(Continued)

*Primary Examiner* — Clayton R Williams
(74) *Attorney, Agent, or Firm* — Fish & Richardson, P.C.

(57) ABSTRACT

Methods, systems, and apparatus, including computer programs encoded on a computer storage medium, for managing an application having sub-applications sharded across different servers. A plurality of servers each serve a separate sub-application of a primary application that includes one or more of the sub-applications. The sub-applications are combined at a client device to create a graphical user interface of the primary application. Each of the sub-applications is separately served in response to multiple different network calls to multiple different servers initiated by the client device. Synchronization code, served by one or more of the servers, prevents the client device from initiating a network call for UI code that renders static user interface elements of each sub-application until the client device has initiated one or more networks calls requesting data that will be presented by a given user interface view of the sub-application.

23 Claims, 8 Drawing Sheets

(51) Int. Cl.
  *H04L 29/06* (2006.01)
  *G06F 16/958* (2019.01)
  *G06F 9/54* (2006.01)
  *G06F 9/451* (2018.01)
(52) U.S. Cl.
  CPC ...... *H04L 41/0233* (2013.01); *H04L 67/1095* (2013.01); *H04L 67/146* (2013.01); *H04L 67/42* (2013.01)

(56) References Cited

U.S. PATENT DOCUMENTS

| | | | |
|---|---|---|---|
| 2003/0145305 A1 | 7/2003 | Ruggier | |
| 2007/0101258 A1* | 5/2007 | Xu | G06F 17/30893 715/234 |
| 2009/0292791 A1 | 11/2009 | Livshits et al. | |
| 2012/0110435 A1* | 5/2012 | Green | G06F 17/30893 715/234 |
| 2012/0137201 A1* | 5/2012 | White | G06F 17/30899 715/205 |
| 2012/0159308 A1* | 6/2012 | Tseng | G06F 9/4443 715/234 |
| 2013/0007114 A1* | 1/2013 | Wee | G06F 9/505 709/203 |
| 2013/0117845 A1* | 5/2013 | Kerschbaumer | G06F 21/53 726/22 |
| 2015/0186492 A1 | 7/2015 | Shalita et al. | |

FOREIGN PATENT DOCUMENTS

| | | |
|---|---|---|
| JP | 2014038577 | 2/2014 |
| WO | WO 2006/005655 | 1/2006 |
| WO | WO 2014/183557 | 11/2014 |

OTHER PUBLICATIONS

Anonymous. "Tab (GUI)—Wikipedia," Dec. 7, 2015, [retrieved on Nov. 25, 2016] Retrieved from the Internet: URL<https://en.wikipedia.org/w/index.php?title=Tab_(GUI)&oldid=694224301> 7 pages.

'www.medium.com' [online] "How Sharding Works—Medium," Jeeyoung Kim, Dec. 5, 2014, [retrieved on Nov. 22, 2016] Retrieved from Internet URL<https://medium.com/@jeeyoungk/how-sharding-works-b4dec46b3f6#.rmv99gtkq> 12 pages.

* cited by examiner

LOW LATENCY APPLICATIONS USING MULTIPLE SERVERS

CROSS-REFERENCE TO RELATED APPLICATION

This application claims priority to U.S. Provisional Application No. 62/311,827, filed on Mar. 22, 2016. The disclosure of the prior application is considered part of and is incorporated by reference in the disclosure of this application.

BACKGROUND

This specification relates to data processing through applications having sub-applications.

The Internet facilitates the exchange of information and transactions between users across the globe. Users can be presented with information in user interfaces, e.g., that are controlled by applications such as web-based applications. User interfaces can present information on a screen, and different types of information can be presented in different areas of the screen. Generally, the amount of time required to render and or present information within a user interface will increase as the amount of information to be presented increases.

SUMMARY

In general, one aspect of the subject matter described in this specification can be implemented in systems that include a plurality of servers that each serve a separate sub-application of a primary application that includes one or more of the separate sub-applications. The one or more separate sub-applications are combined at a client device to create a graphical user interface of the primary application. Each of the sub-applications is separately served in response to multiple different network calls to multiple different servers that are initiated by the client device. Synchronization code, served by one or more of the plurality of servers, prevents the client device from initiating a network call for UI code that renders static user interface elements of each sub-application until the client device has initiated one or more networks calls requesting data that will be presented by a given user interface view of the sub-application.

These and other implementations can each optionally include one or more of the following features. The plurality of servers can include a host server that processes page load requests for pages that include a sub-application, a child server that serves a set of data that initializes the sub-application without providing sufficient code required to render a user interface of the sub-application, a resource server that serves a set of code that is combined with the set of data to render the user interface of the sub-application, and a mixer that routes network calls from a user device to each of the host server, the child server, and the resource server based on information in the network calls. The set of data served by the child server does not, in some implementations, include code that manipulates the Document Object Model of a page that includes the sub-application, and the set of code served by the resource server includes the code that manipulates the DOM of the page. The synchronization code can prevent the client device from initiating a network call for the UI code only after the client device has initiated all network calls for all data that will be presented by the given user interface view of the sub-application. In response to a page load request, the host server can transmit, to the client device, a first response that includes, a set-cookie header that includes an identifier of the host server, a first network path corresponding to the child server, a second network path corresponding to the resource server, and the synchronization code. The synchronization code can instruct the client device to initiate a first network call to the first network path requesting, from the child server, one or more components of the sub-application. In response to the first network call, the child server can transmit, to the client device, a second response that includes a new set-cookie header that includes an identifier of the child server, and enables a same child server to be subsequently called by the client device and code that triggers a subsequent network call to the resource server requesting, from the resource server, the UI code that renders static user interface elements of the sub-application. The synchronization code can initiate, using the new set-cookie header, one or more additional network calls to the child server requesting one or more sets of data that will be presented by the given user interface view of the sub-application, and the synchronization code delays the subsequent network call to the resource server until each of the one or more network calls to the child server have been initiated by the client device. The synchronization code can delay execution of the UI code until responses to the one or more additional network calls have been received by the client device. Prior to initiation of the one or more additional network calls to the child server, the child server can pre-load a dataset corresponding to information included in the first network call requesting the one or more components of the sub-application.

In general, another innovative aspect of the subject matter described in this specification can be implemented in methods that include receiving, by a mixer and from a client device, a page load request for a page that includes a sub-application; routing, by the mixer, the page load request to a host server that processes page load requests for pages that include one or more sub-applications; and processing, by the host server, the page load request. Processing includes transmitting, to the client device, a response that includes instructions that redirect the client device to a child server that serves a set of data that initializes the sub-application without providing sufficient code required to render a user interface of the sub-application, and synchronization code that prevents the client device from initiating a network call for UI code that renders static user interface elements of the sub-application until the client device has initiated one or more network calls to one or more child servers requesting data that will be presented by a given user interface view of the sub-application.

These and other implementations can each optionally include one or more of the following features. The method can further include receiving, by a given child server, a network call initiated at a client device based on the instructions transmitted by the host server, and transmitting, to the client device, the set of data that initializes the sub-application at the client device without providing sufficient code required to render the user interface of the sub-application. The method can further include receiving, by a resource server, a second network call from the client device, and transmitting, by the resource server and in response to the second network call, a set of code that is combined, at the client device, with the set of data to render the user interface of the sub-application at the client device. The set of data transmitted by the child server does not, in some implementations, include code that manipulates the Document Object Model of a page that includes the sub-application, and the set of code transmitted by the resource server includes the code that manipulates the DOM of the page. The response transmitted by the host can include a set-cookie header that includes an identifier of the host server, a first network path corresponding to the child server, a second network path corresponding to the resource server, and the synchronization code.

In general, another aspect of the subject matter described in this specification can be implemented a non-transitory computer storage medium encoded with a computer program. The program can include instructions that when executed by a distributed computing system cause the distributed computing system to perform operations including receiving, by a mixer and from a client device, a page load request for a page that includes a sub-application; routing, by the mixer, the page load request to a host server that processes page load requests for pages that include one or more sub-applications; and processing, by the host server, the page load request. The processing includes transmitting, to the client device, a response that includes instructions that redirect the client device to a child server that serves a set of data that initializes the sub-application without providing sufficient code required to render a user interface of the sub-application and synchronization code that prevents the client device from initiating a network call for UI code that renders static user interface elements of the sub-application until the client device has initiated one or more network calls to one or more child servers requesting data that will be presented by a given user interface view of the sub-application.

These and other implementations can each optionally include one or more of the following features. The operations can further include receiving, by a given child server, a network call initiated at a client device based on the instructions transmitted by the host server, and transmitting, to the client device, the set of data that initializes the sub-application at the client device without providing sufficient code required to render the user interface of the sub-application. The operations can further include receiving, by a resource server, a second network call from the client device, and transmitting, by the resource server and in response to the second network call, a set of code that is combined, at the client device, with the set of data to render the user interface of the sub-application at the client device. The set of data transmitted by the child server does not, in some implementations, include code that manipulates the Document Object Model of a page that includes the sub-application, and the set of code transmitted by the resource server includes the code that manipulates the DOM of the page. The response transmitted by the host can include a set-cookie header that includes an identifier of the host server, a first network path corresponding to the child server, a second network path corresponding to the resource server, and the synchronization code.

Particular embodiments of the subject matter described in this specification can be implemented so as to realize one or more of the following advantages. The amount of time required to present and/or update information presented in a primary application can be reduced by creating the primary application (e.g., a large web-based application) using multiple sub-applications (e.g., plural smaller, web-based applications). Errors associated with one of the sub-applications (e.g., page load errors, failed network calls, or slow server responses) will not prevent others of the sub-applications from loading properly, thereby reducing the impact of these errors on the proper operation of the primary application. Each sub-application can be independently managed by a different team, which can enable separate development teams to independently develop and/or maintain (e.g., update) the different sub-applications. Each sub-application can use, for example, a different user interface (UI) platform than the rest of the sub-applications. Also, each of the different teams can have an independent development cycle and release schedule. Further, each of the different teams can decide on its own development platform, including the programming language(s) in which its sub-application is written.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document discloses systems, methods, and computer program products for serving data for a primary application that includes separate sub-applications. For example, the primary application can be a web-based application that includes, in addition to an application-specific header, information and controls, a user interface (UI) area that includes sub-areas. In some implementations, content presented in each sub-area is generated (or provided) by a separate sub-application. Each sub-application can be provided/maintained by a separate application team (or organization), and updated on a separate schedule of version updates. The primary application can be presented on a client device, e.g., in a graphical user interface (GUI).

In order to present information from the primary application and each sub-application in a same GUI of the client device, data supporting the primary application (and separate sub-applications) can be requested from various servers. For example, a host server can process page load requests for pages that include the primary application and respective sub-applications. A child server can serve a set of data for initialization of a given sub-application, e.g., without providing sufficient code required to render the user interface of that sub-application. A resource server can serve a set of code that is combined with the set of data served by the child server in order to render the user interface of the sub-application. Synchronization code that is served by the various servers can, for example, prevent the client device from initiating a network call for UI code that renders static user interface elements of each sub-application until the client device has initiated one or more networks calls requesting data that will be presented by a given user interface view of the sub-application. A mixer can route network calls from the user device to each of the host server, the child server, and the resource server based on information in the network calls.

While this document discusses low latency loading of applications from multiple servers, other aspects in addition to low latency are described. For example, large script-based applications can be "sharded" (e.g., sub-divided by sub-applications or other divisions) for optimal user experience and efficiency in managing the presentation of an application. Optimization can provide, for example, optimal loading (e.g., bootstrapping) of a sharded application, optimal loading for a place change (subsequent shard loads for the placement and visibility of sub-applications), and place management.

Figure 1:
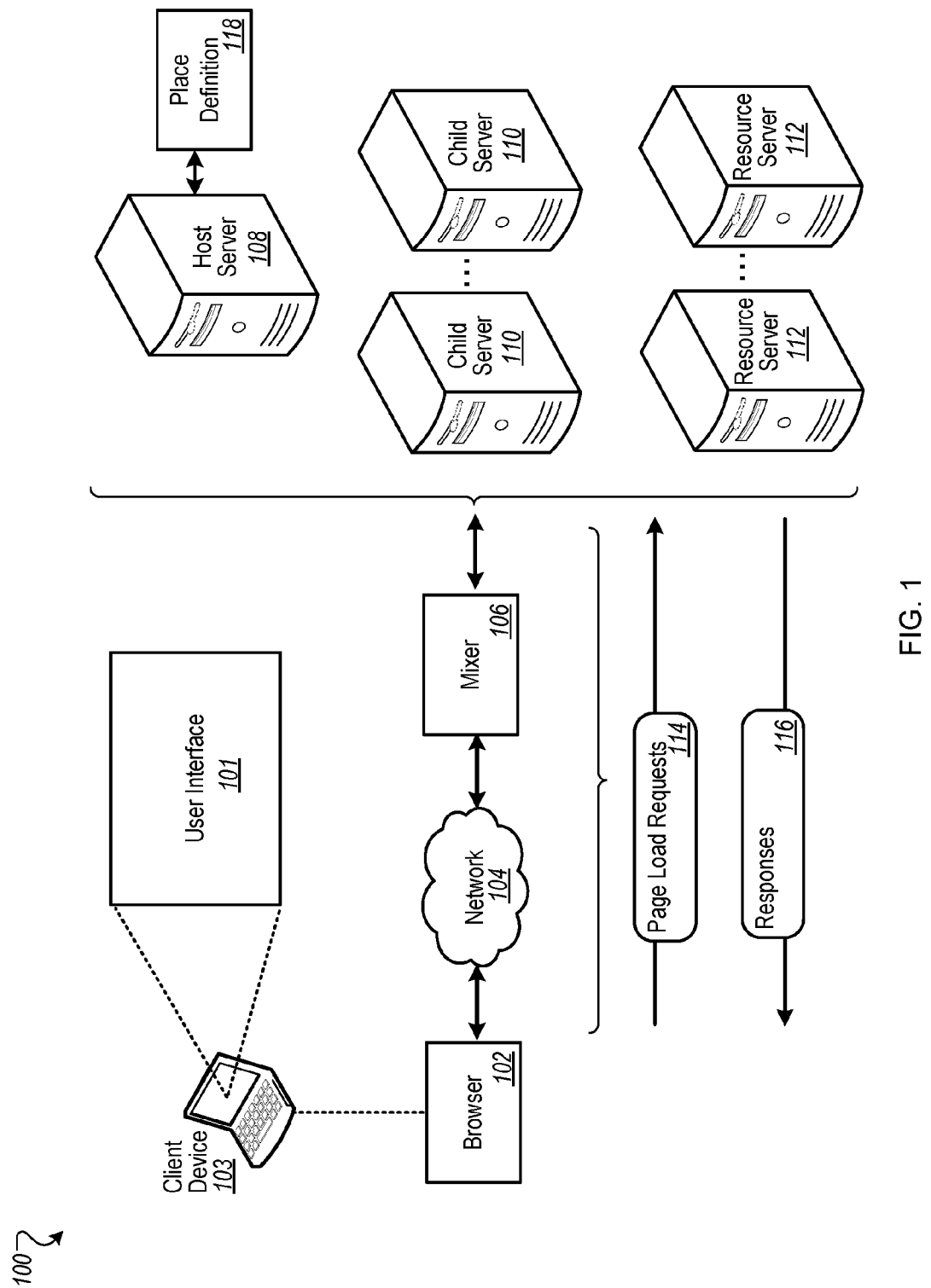
FIG. 1 is a block diagram of an example environment in which a primary application is provided in a user interface.

FIG. 1 is a block diagram of an example environment 100 in which a primary application is provided in a user interface (UI) 101. The environment 100 includes the components needed to efficiently serve data and resources for the primary application and the sub-applications in the UI 101. For example, the primary application can be a web-based application that is hosted by a server and accessible through (and executes within) a browser 102 running on a client device 103. The environment 100 includes a host server 108 that processes page load requests 114 for pages that include one or more sub-applications. Each sub-application is associated with (e.g., assigned to) a given UI view (e.g., visible portion) of the UI 101. The environment 100 also includes one or more child servers 110, each serving a set of data that initializes a sub-application without providing sufficient code required to render and/or present a user interface of the sub-application that is serviced by that child server. One or more resource servers 112 in the environment 100 can serve a set of code, e.g., Hyper-Text Mark-up Language (HTML) code, that is combined with the set of data provided by the child server to render the user interface of the sub-application. A mixer 104 can route network calls (e.g., including page load requests 114) from the client device 103 to each host server 108, each child server 110, and each resource server 112. Based on information in the network call, the mixer can automatically select the server 108, 112 or 114 to which a particular network call is routed. All of the above components of the environment 100 are used at various times and in various ways in order to render a web application on the browser 102.

In some implementations, other user interfaces different from the UI 101 can have their own different set of a mixers, a host server, child server(s), and resource server(s). In some implementations, other arrangements and communication scenarios of the mixer 106 and the servers 108, 112 and 114 can be used, and other components can be added to the environment 100 in order to facilitate the serving of data for sub-applications of the primary application associated with the UI 101.

The mixer 106 can be responsible for routing an incoming user request (e.g., a page load request 114) to an appropriate backend server (e.g., one of the servers 108, 110 or 112). In some implementations, there can be one mixer 106, or there can be multiple mixers 106, e.g., that route requests received through a network 104. In some implementations, the network 104 can comprise the Internet and various other wired networks, wireless networks, local area networks (LANs), wide area networks (WANs), and other networks. Further, some or all of data, communications, requests and responses of the components of the environment 100 can pass through the network 104.

The host server 108 can function, for example, as a parent server for the entry point to the primary application and sub-applications. In some implementations, all initial page load request and all reload page requests go through the host server 108. The host server 108 further contains configuration information for the application to be loaded (and/or operate) properly. Typically, the host server 108 does not contain the primary application.

The child servers 110 can provide logic needed to initialize a sub-application with respect to the primary application. For example, a separate child server 110 can serve each of the sub-applications of a primary application provided in the UI 101. The child servers 110 typically do not contain the resources necessary to render the UI component itself, rather, additional data is generally required to be downloaded from the resource server 112 in order to render and/or present the UI of the sub-application.

A resource server 112 can be responsible for serving static content including, for example, images, cascading style sheets, and other static content. Resource servers 112 can be replicated many times and in many localities so that, for example, a user of the primary application is always closer to the resource servers 112 than to host servers 108 or child servers 110. Resource servers 112 can be a highly replicated resource server, such that the data hosted for a given sub-application may be available from multiple different instances of the resource server 112. These various instances of the resource server 112 can be deployed at various different geographic locations. As such, the particular resource server 112 that the mixer 106 selects to service (e.g., process and respond to) a given network call, can be chosen in a manner that reduces the total time required to service the given network call. For example, the mixer 106 may use information about current load conditions of various resource servers and/or geographic locations of those resource servers to identify the particular resource server 112 that will service a given network call. Generally, servers that are located closer to a client device will be able to provide a response more quickly. Meanwhile, servers that are experiencing a lower load are generally able to process and respond to network calls more quickly than servers that are experiencing a higher load condition. In some implementations, the resource server 112 that can service the given network call in the least amount of time is chosen to service the given network call.

In some implementations, a place definition module 118 can determine which portions (associated with sub-applications) of the UI 101 are to be displayed (or hidden), e.g., based on which responses 116 have been received and which requests to servers 110 and 112 are still pending (or not yet sent). This can prevent a situation in which the UI 101 contains incomplete information associated with a particular sub-application.

Figure 2:
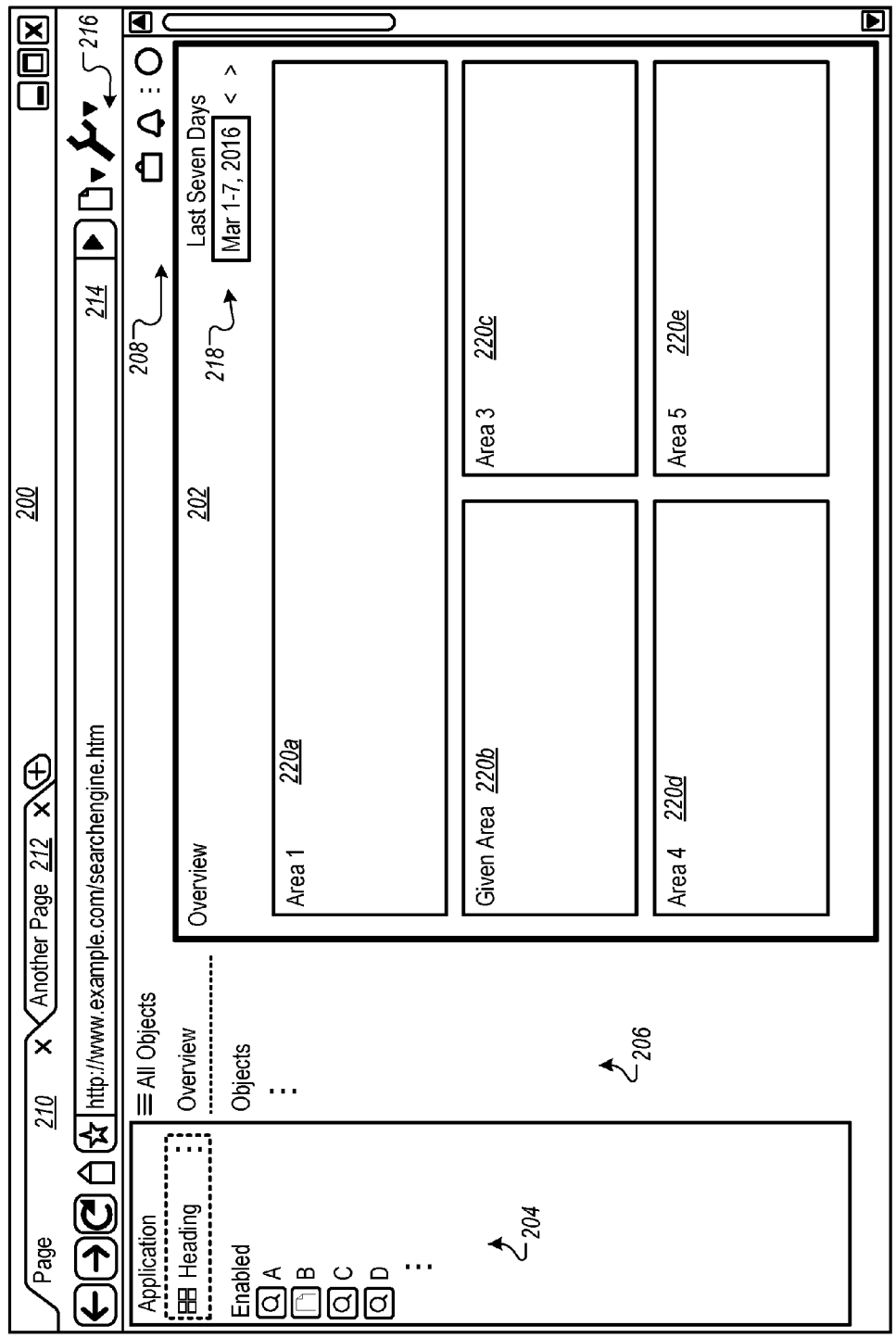
FIG. 2 is a screen shot of an example user interface provided by a primary application.

FIG. 2 is a screen shot of an example user interface 200 provided by a primary application. For example, the user interface 200 can be the user interface 101 described above with reference to FIG. 1. As shown in FIG. 2, the primary application can control UI elements outside of a UI area 202 in which sub-applications can control the UI. For example, the primary application can control side components 204, 206 and control components 208, while the browser 102 may control components 210, 212, 214 and 216. The sub-applications, however, may control UI components 220*a*-220*e*. In some implementations, a UI component 218 can be controlled by yet another sub-application, and information associated with the UI component 218 (e.g., dates associated with conversions of advertisements) can be used in association with data presented in (and requested for) the UI components 220*a*-220*e*. For example, data range information associated with the UI component 218 can be used as a filter in requesting data for the UI components 220*a*-220*e*. In this way, the application associated with the UI 200 can be split into separate sub-applications, each associated with a respective one of the UI components 218 and 220*a*-220*e*.

As shown, content (e.g., child content) for the UI area 202 can be dynamically loaded from different child servers 210, e.g., based on the universal resource locator (URL) of the sub-application. Components 204-212 can include, for example, universal navigation components, and the components 204-212 can belong to the primary application (e.g., served by host server 208). In some implementations, there may be no components outside of the UI area 202, meaning that all of the rendered content of the user interface 200 can come from sub-applications (e.g., served by child servers 210).

In some implementations, the place definition 118 can choose to hide or show some or all of the various components 218 and 220*a*-220*e*. For example, using place configuration information, the place definition 118 can decide to hide one or more of the various components 218 and 220*a*-220*e* if, for example, data needed to render a particular component has not yet been received. In such situations, navigational components and other components at the primary application level, including components 204-212, can be shown, but certain ones of the components 220*a*-220*e* may be shown while others are hidden. In this way, a user viewing the UI 101 can be presented with a persistent header regardless of various child application loads and transitions.

The host server 108 associated with the application and can manage application download, application unload, and/or other functions at a level of the primary application. This can help to conserve memory consumption of the primary application, as the child servers 108 can each be responsible for serving data for their respective sub-applications.

Figure 3:
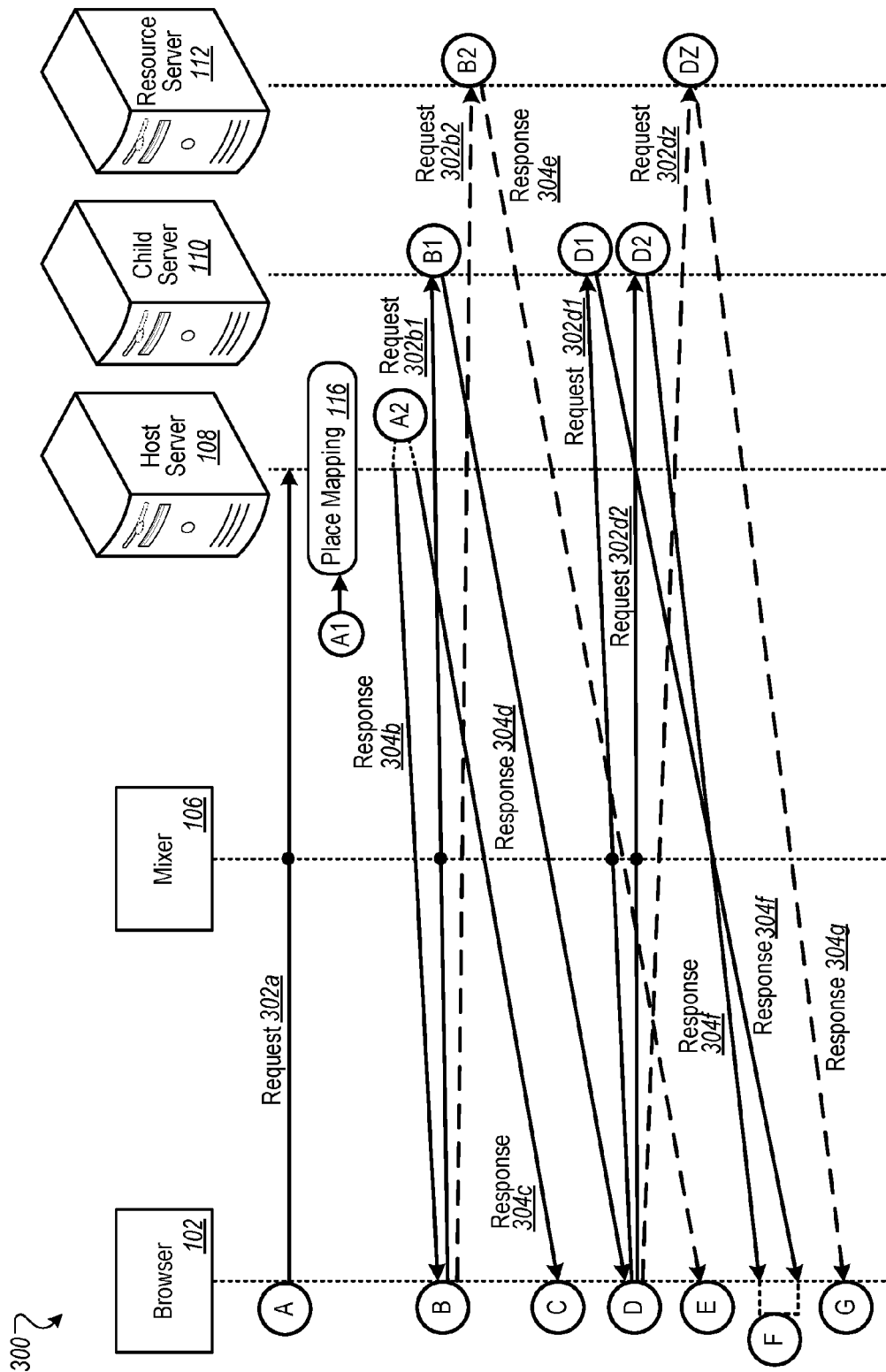
FIG. 3 is a swim lane diagram showing example requests and responses for non-versioned data.

FIG. 3 is a swim lane diagram 300 showing example requests and responses for versioned data. For example, the diagram 300 shows example steps for providing data for a primary application and corresponding sub-applications. The plural components can be stitched together, e.g., into one seamless user interface 202.

A scenario that is enabled by elements of FIG. 3 can begin, for example, when a user enters a URL (e.g., example.com/aw/overviews) in a browser (e.g., the browser 102 described above). The browser 102 can issue, at step A, a request 302*a*, e.g., the page load request 114. The mixer 106 can intercept and process the request 302*a*, e.g., locating "example.com/aw" in the URL and mapping the request 302*a* to a particular host web server (e.g., IP address of host server 108). At step A1, the host server 106 can process the page load request for pages that include a sub-application associated with the primary application. For example, the host server 108 can map "/aw/overviews" to a child web server (e.g., a particular child server 110). Also, at step A1, the place mapping 116 can be initialized, e.g., to begin controlling which portions of the UI 101 are to be shown (and which are to be hidden).

At step A2, a response 304*b* can be provided by the host server 108, in response to the page load request, and transmitted to the client device (e.g., for use by the browser 102). The response 304*b* can include a set-cookie header that includes an identifier of the host server 108, a first network path corresponding to the child server 110, a second network path corresponding to the resource server 112, and synchronization code. In some implementations, the response 304*b* can include, for example, code corresponding to the following pseudocode:

```
<script type='text/javascript'>
    (function ( ) {
        var CHILD_APP_ID = '...';
        var B1_PATH = '...'; // Child app load path
        var B2_PATH = '...'; // Host app static resources
        var D1_PATH = '...'; // Child data 1 path var
        D2_PATH = '...'; // Child data 2 path
        // Send requests for B1 & B2
        sendRequest(B1_PATH, handleChildRequestCompletion,
        loadChildAppData);
        sendRequest(B2_PATH, handleHostStaticResourceCompletion);
        function sendRequest(scriptPath, onComplete,
        onBeforeComplete) { var xhr =
            newXHR( );
            xhr.onreadystatechange = function( ) { if
                (xhr.readyState == 4) {
                    if (xhr.status ==200) { if
                        (onBeforeComplete) {
                            onBeforeComplete( );
                        }
                        createScript(xhr.responseText);
                    }
                    onComplete(xhr);
                }
            };
            xhr.open('GET', scriptPath, true);
            xhr.send(null);
        }
        function loadChildAppData( ) {
            // Send requests for D1 & D2
            sendRequest(D1_PATH,
            handleInitialDataRequestCompletion);
            sendRequest(D2_PATH,
            handlePrefetchRequestCompletion);
        }
        function handleChildRequestCompletion(xhr) {
            var childLoadRequestVariableName = CHILD_APP_ID +
            "ChildRequest";
            window[childLoadRequestVariableName] = xhr;
            if (window[childLoadRequestVariableName +
            "_callback"]) {
                window[childLoadRequestVariableName +
                "_callback"]( );
            }
        }
        function newXHR( ) {
            if (window.XMLHttpRequest) { return
                new XMLHttpRequest( );
            } else { try {
                    return new
                    ActiveXObject('MSXML2.XMLHTTP.3.0');
                } catch(e) {
                    return new
                    ActiveXObject('Microsoft.XMLHTTP');
                }
            }
        }
        function createScript(scriptContent) {
            var scriptElement = document.createElement('script');
            scriptElement.type = 'text/javascript';
            scriptElement.innerHTML =
            scriptContent; document.body.appendChild(scriptElement);
        }
        function handleHostStaticResourceCompletion(xhr) { ... }
        function
        handleInitialDataRequestCompletion(xhr) { ... } function
        handlePrefetchRequestCompletion(xhr) { ... }
    })( );
</script>
```

In some implementations, the GET request in the example pseudocode can be replaced with some other type of request, such as a POST request.

The synchronization code, received with the response 304b, can instruct the client device 103 to initiate a first network call (e.g., at step B) to the first network path. The call can request one or more components of the sub-application from the child server 110. For example, the synchronization code can indicate the order in which requests 302b1, 302d1, and 302d2 are to be made to the child server 110.

A response 304c can also be provided by the host server 108. The response 304c, for example, includes the data required to render the host UI components.

At step B, after the response 304b is received at the browser 102, the script can cause issuance of the requests 302b1 and 302b2 (e.g., in parallel). Request 302b1 is made to the child server 110 to provide data that will allow the UI components of the primary application to run. Request 302b2 is made to the resource server 112 to provide resources that will allow the UI components of the primary application to be rendered. Further, requests 302d1 and 302d2 can be sent after step B1 has completed. Further, even before the response resulting from step B1 (e.g., the response 304d) is received, the request 302dz can be sent to the resource server 112.

At step B1, for example, in response to the first network call, the child server 110 can transmit, to the client device 103, a second response (e.g., a response 304d). The response 304d can include, for example, a new set-cookie header that includes an identifier of the child server 110, enabling the same child server 110 to be subsequently called by the client device. The response 304d can include code that triggers a subsequent network call to the resource server 112 requesting, from the resource server 112, the UI code that renders static user interface elements of the sub-application.

At step B2, the received request 302b2 can cause invoking a GET/POST to fetch necessary static resources from the resource server 112. For example, step B2 and the associated request 302b2 can occur right after step B1, e.g., without waiting for the response 304d from step B1. The result of step B2 is a result 304e.

In some implementations, in the response 304d, for example, a set of data served by the child server 110 does not include code that manipulates the Document Object Model (DOM) of a page that includes the sub-application. Further, the set of code served by the resource server 112 includes the code that manipulates the DOM of the page. For example, the response 304d can include script code to trigger the download of static resources of the child server 110. Further, response 304d can contain a set-cookie header for the server host cookie and can set a backend of the child server 110 to maintain stickiness to the instance of the child server 110.

At step C, the browser 102, using the response 304c, has the data required to render the host UI components. For example, the rendered information can include data associated with the components 204-212. The response 304c does not contain any code related to document manipulation, e.g., creating or destroying <div> tags or updating CSS. However, the response 304c can be used to set window variables and invoke registered callbacks for the variables, such as in the following pseudocode:

```
var userData = '...';
if (window['onUserDataAvailableCallbacks']) {
    for (i = 0; i < window['onUserDataAvailableCallbacks'].length; i++){
        window['onUserDataAvailableCallbacks'][i]( );
    }
}
```

At step D, using synchronization code in the response 304d, for example, requests can be issued to the child server 110 and the resource server 112. For example, the synchronization code can initiate, using the new set-cookie header, one or more additional network calls to the child server 110 requesting one or more sets of data that will be presented by the given user interface view of the sub-application. Further, the synchronization code can delay the subsequent network call to the resource server 112 until each of the one or more network calls to the child server 110 have been initiated by the client device 103 (e.g., by the browser 102). For example, the browser 102 can issue requests 302d1 and 302d2 to the child server 110, and a request 302dz to the resource server 112. The synchronization code can be used, for example, to delay execution of UI code, e.g., at the browser 102, until responses to the one or more additional network calls have been received by the client device 103.

At steps D1 and D2, for example, the child server 110 can handle the requests 302d1 and 302d2, respectively, and provide responses 304f to the browser 102. For example, the child server 110 can identify the data that is needed by the application and send it to the browser 102. At step DZ, for example, the resource server 112 can handle the requests 302dz and provide a response 304g to the browser 102. An order of invocation can be, for example, D1→D2> . . . →DZ. For example, the resource server 112 identifies the requested UI data and responds to the request providing the UI data.

At step E, the response 304e (received after execution of step B2) can be processed. For example, the response 304e can contain all the resources (e.g., HTML components) necessary for the browser 102 to render the host UI components 204-212.

At step F, the responses 304f from steps D1 and D2 are available from the child server 110. The responses 304f can be purely serialized data responses from the child server 110 that contain all the necessary data for UI components to work.

At step G, for example, the response 304g is available after execution of step DZ. The response 304g contains all the necessary resources to render UI components associated with the sub-applications. At this point, if any of the responses 304c, 304e or 304f have not yet come back, the system can wait and synchronize before rendering occurs.

In some implementations, prior to initiation of the one or more additional network calls to the child server 110, the child server 110 can pre-load a dataset corresponding to information included in the first network call that requests the one or more components of the sub-application. Pre-loading the data set can effectively achieve pre-caching of data when request 302b1 is received from client device. This "warming up" of the child server 110 can allow data requested in requests 302d1, 302d2, and so on, to be available in cache, which reduces latency. For example, rather than waiting to receive the requests 302d1 or 302d2 before identifying the data that will be used by the sub-application, the server identifies and caches that data when request 302b1 is received. As such, the data is already in high-speed memory (i.e., the cache) when the requests 302d1 and/or 302d2 are received, which enables the server 110 to respond to the received requests more quickly than if the data were only identified and transmitted following receipt of these requests 302d1 and 302d2.

Figure 4:
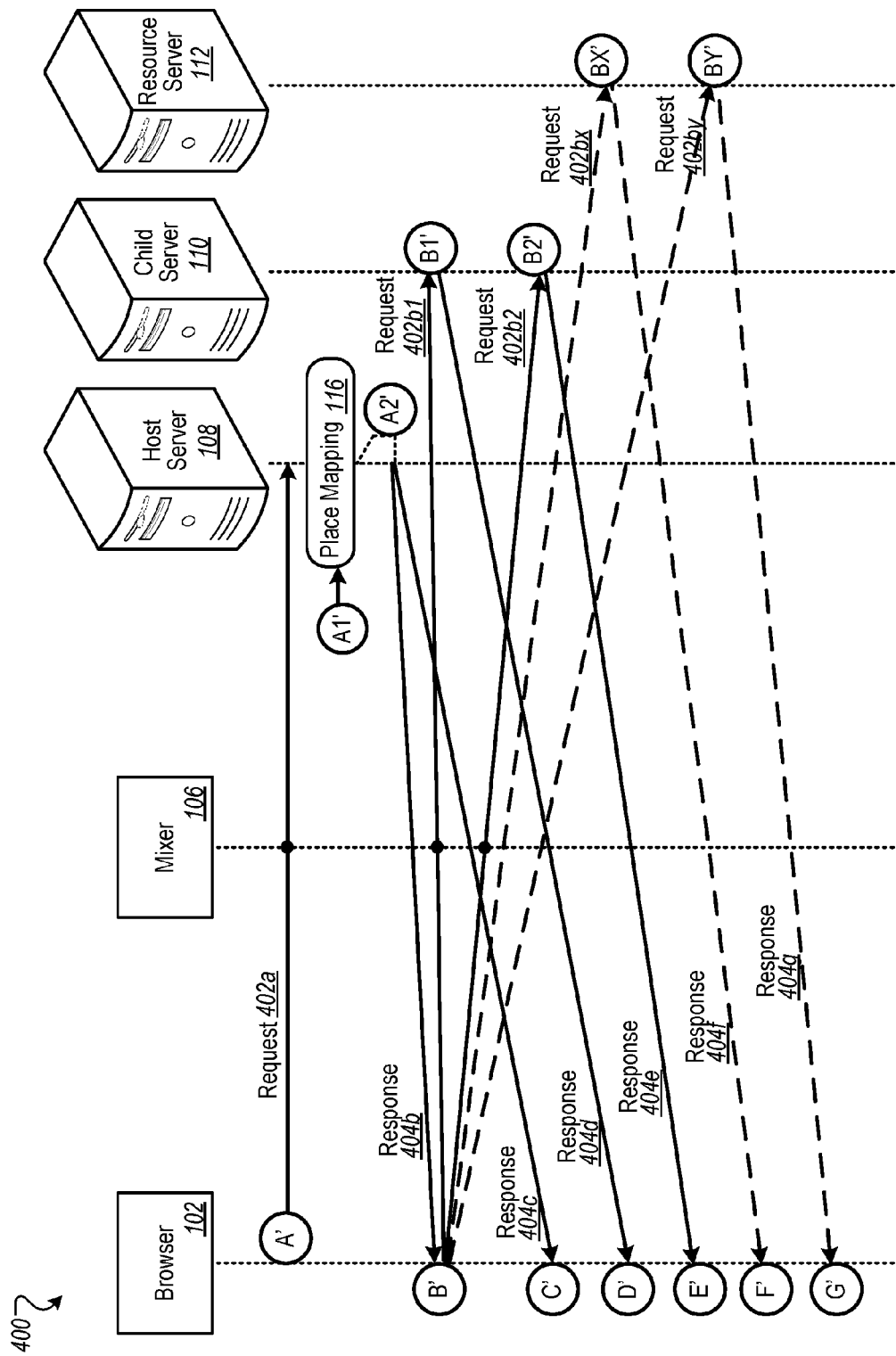
FIG. 4 is a swim lane diagram showing example requests and responses for versioned data.

FIG. 4 is a swim lane diagram 400 showing example requests and responses for non-versioned data. For example, similar to the diagram 300 that is associated with versioned data, the diagram 400 shows example steps for providing data for a primary application that is composed of plural sub-applications. The plural web components can be stitched together, e.g., into one seamless user interface 202. The plural web components described in diagram 400 are versioned, which means that every new release is backward compatible with an old one.

As is similar to FIG. 3, a scenario that is enabled by elements of FIG. 4 can begin, for example, when a user enters a URL (e.g., example.com/aw/overviews) in a browser (e.g., the browser 102 described above). The browser 102 can issue, at step A', a request 402a, e.g., the page load request 114. The mixer 106 can intercept and process the request 402a, e.g., locating "example.com/aw" in the URL and mapping the request 402a to a particular host web server (e.g., IP address of host server 108). At step A1', the host server 106 can process the page load request for pages that include a sub-application associated with the primary application. For example, the host server 108 can map "/aw/overviews" to a child web server (e.g., a particular child server 110). Also, at step A1', the place mapping 116 can be initialized, e.g., to begin controlling which portions of the UI 101 are to be shown (and which are to be hidden).

At step A2' (similar to FIG. 3), a response 404b can be provided by the host server 108, in response to the page load request, and transmitted to the client device (e.g., for use by the browser 102). Unlike the response 304b, the response 404b does not include a set-cookie header that includes an identifier of the host server 108. However, the response 404b does include a first network path corresponding to the child server 110, a second network path corresponding to the resource server 112, and synchronization code (e.g., for synchronizing requests, as described above). In some implementations, the response 404b can include, code corresponding to the following pseudocode:

```
<script type='text/javascript'>
    (function ( ) {
        var CHILD_APP_ID = '...';
        var BX_PATH = '...'; // Host app static resources
        var BY_PATH = '...'; // Child app static resources
        var B1_PATH = '...'; // Child data 1 path
        var B2_PATH = '...'; // Child data 2 path
        // Send requests for B1, B2, BX, BY
        sendRequest(B1_PATH, handleChildRequestCompletion);
        sendRequest(B2_PATH, handleHostStaticResourceCompletion);
        sendRequest(BX_PATH, handleInitialDataRequestCompletion);
        sendRequest(BY_PATH, handlePrefetchRequestCompletion);
        function sendRequest(scriptPath, onComplete) {
            var xhr = newXHR( );
            xhr.onreadystatechange = function( ) {
                if (xhr.readyState == 4) {
                    if (xhr.status == 200) {
                        createScript(xhr.responseText);
                    }
                    onComplete(xhr);
                }
            };
            xhr.open('GET', scriptPath, true);
            xhr.send(null);
        }
        function newXHR( ) {
            if (window.XMLHttpRequest) {
```

-continued

```
                return new XMLHttpRequest( );
            } else {
                try {
                    return new
                        ActiveXObject('MSXML2.XMLHTTP.3.0');
                } catch(e) {
                    return new
                        ActiveXObject('Microsoft.XMLHTTP');
                }
            }
        }
        function createScript(scriptContent) {
            var scriptElement = document.createElement('script');
            scriptElement.type = 'text/javascript';
            scriptElement.innerHTML = scriptContent;
            document.body.appendChild(scriptElement);
        }
        function handleChildRequestCompletion(xhr) {
            var childLoadRequestVariableName = CHILD_APP_ID +
                "ChildRequest";
            window[childLoadRequestVariableName] = xhr;
            if (window[childLoadRequestVariableName +
                "_callback"]) {
                window[childLoadRequestVariableName +
                    "_callback"]( );
            }
        }
        functionhandleHostStaticResourceCompletion(xhr) { ... }
        functionhandleInitialDataRequestCompletion(xhr) { ... }
        function handlePrefetchRequestCompletion(xhr) { ... }
    })( );
</script>
```

In some implementations, as is the case for FIG. 3, the GET request in the example code can be replaced with some other type of request, such as a POST request.

Synchronization code received with the response 404b can instruct the client device 103 to initiate a first network call (e.g., at step B') to the first network path. The call can request one or more components of the sub-application from the child server 110. For example, the synchronization code can indicate that requests 402b1 and 402d1 are to be made to the child server 110, and that requests 402bx and 402by are to be made to the resource server 112

A response 404c can also be provided by the host server 108. The response 404c, for example, includes the data required to render the host UI components.

At step B', after the response 404b is received at the browser 102, the script can cause issuance of the requests 402b1, 402b2, 402bx and 402by (e.g., in parallel).

At step B1', for example, in response to the first network call, the child server 110 can transmit, to the client device 103, a second response (e.g., a response 404d). The response 404d can include, for example, a new set-cookie header that includes an identifier of the child server 110, enabling the same child server 110 to be subsequently called by the client device.

At step B2', for example, the child server 110 can transmit, to the client device 103, a response 404e. The response 404e can include, for example, a new set-cookie header that includes an identifier of the child server 110, enabling the same child server 110 to be subsequently called by the client device.

At step C', the browser 102, using the response 404c, has the data required to render the host UI components. For example, the rendered information can include data associated with the components 204-212. The response 404c does not contain any code related to document manipulation, e.g., creating or destroying <div> tags or updating CSS. However, the response 404c can be used to set window variables and invoke registered callbacks for the variables, such as in the following code:

```
var userData = '...';
if (window['onUserDataAvailableCallbacks']) {
    for (i = 0; i < window['onUserDataAvailableCallbacks'].length;
    i++){
        window['onUserDataAvailableCallbacks'][i]( );
    }
}
```

At step BX', for example, the resource server 112 can handle the request 402*bx* and provide a response 404*f* to the browser 102. At step BY', for example, the resource server 112 can handle the request 402*by* and provide a response 404*g* to the browser 102. An order of invocation can be, for example, B1'→B2'→BX'→BY'.

At step D', using code in the response 404*d*, for example, requests can be issued to the child server 110 and the resource server 112. For example, the synchronization code can initiate, using the new set-cookie header, one or more additional network calls to the child server 110 requesting one or more sets of data that will be presented by the given user interface view of the sub-application.

At step E', the response 404*e* (received from step B2') can be processed. For example, the response 404*e* can contain all the resources (e.g., HTML components) necessary for the browser 102 to render the host UI components 204-212.

At step F', the response 404*f* from step BX' are available from the child server 110. At step G', the response 404*g* from step BY' are available from the child server 110. The responses 404*f* and 404*g* can contain all the necessary data for UI components to work.

Figure 5:
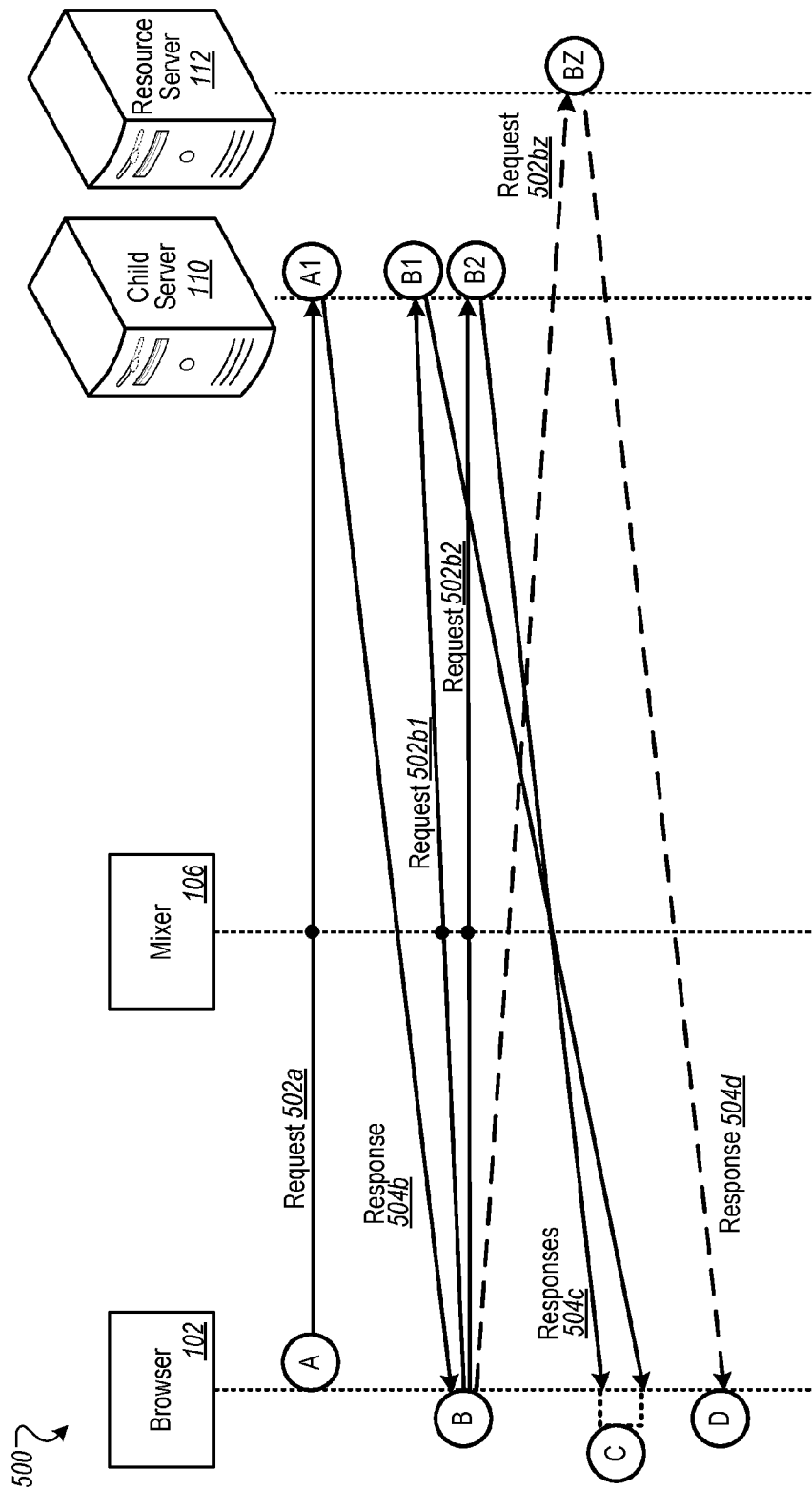
FIG. 5 is a swim lane diagram showing example requests and for loading a child application after an initial load.

FIG. 5 is a swim lane diagram 500 showing example requests and responses for loading a child application after an initial load. For example, the requests and responses can occur during a post-initial page load state, e.g., after a host and one or multiple child applications are already loaded, for the versioned example of FIG. 3.

A scenario that is enabled by elements of FIG. 5 can begin, for example, when a user executes an action that triggers an update of the URL in the browser 102. The update at the browser 102 can occur without reloading the whole page, e.g., including all elements 202, 218, and 220*a*-220*e*. For example, the sub-application associated with UI component 220*b* can have a mapping defined as: " . . . /given-area" mapped to a specific child server 112. Because the host server 108 has already been contacted for the application (e.g., as described with reference to FIG. 4), the host server 108 is not part of this scenario for re-loading the page. As such, the browser 102 can issue, at step A, request 502*a*1 to the child server 110.

At step A1, the child server 110 produces response 504*b* which contains synchronization code for use by the browser 102 to make additional requests to the child server 110 and the resource server 112.

At step B, the browser 102 can issue requests 502*b*1, 502*b*2 to the child server 110, and request 502*bz* is sent to the resource server 112. At steps B1 and B2, responses 504*c* are sent from the child server 110 to the browser 102. The responses 504*c* contain all the necessary data for UI components of sub-application to work, e.g., used in step C. At step BZ, response 504*d* is sent from the child server 110 to the browser 102. The response 504*d* contains all the necessary data to render, at step D, the UI components of sub-application.

Figure 6:
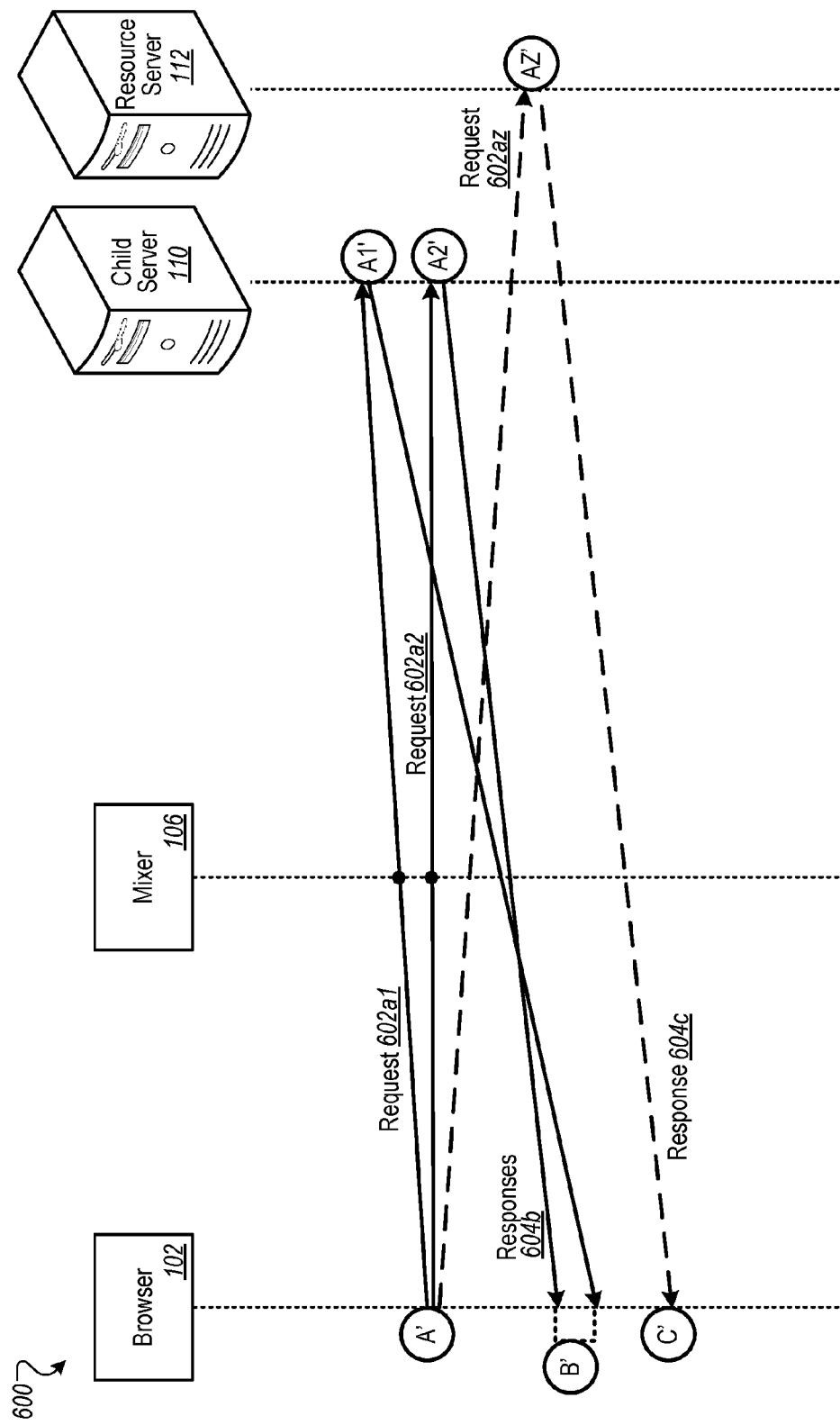
FIG. 6 is a swim lane diagram showing example requests and responses for loading a child application after an initial load.

FIG. 6 is a swim lane diagram 600 showing example requests and responses for loading a child application after an initial load. For example, the requests and responses can occur during a post-initial page load state, e.g., after a host and one or multiple child applications are already loaded, for the non-versioned example of FIG. 4.

A scenario that is enabled by elements of FIG. 6 can begin, for example, when a user executes an action that triggers an update of the URL in the browser 102. The update can occur without reloading the whole page, e.g., including all elements 202, 218, and 220*a*-220*e*. For example, the sub-application associated with UI component 220*b* can have a mapping defined as: " . . . /given-area" mapped to a specific child server 112. Because the host server 108 has already been contacted for the application (e.g., as described with reference to FIG. 4), the host server 108 is not part of this scenario for re-loading the page. As such, the browser 102 can issue, at step A', requests 602*a*1 and 602*a*2 to the child server 110, and request 602*az* is sent to the resource server 112. The requests 602*a*1, 602*a*2 and 602*az* can make use of the synchronization code received previously.

At steps A1' and A2', responses 604*b* are sent from the child server 110 to the browser 102. The responses 604*b*, used in step B', contain all the necessary data for UI components of sub-application to work. At step AZ', response 604*c* is sent from the child server 110 to the browser 102. The response 604*c*, used in step C', contains all the necessary data to render the UI components of sub-application.

Figure 7:
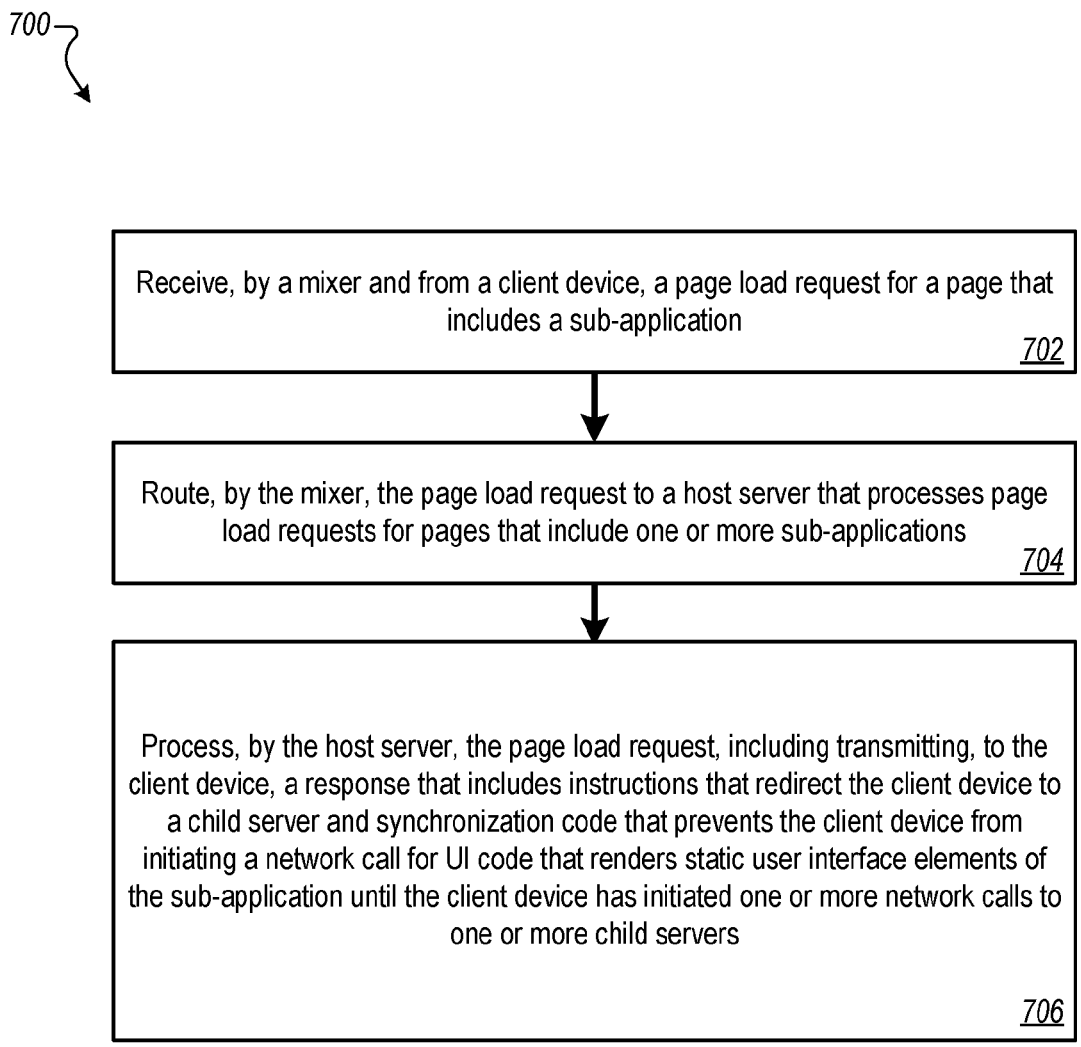
FIG. 7 is a flow diagram of an example process for managing requests and responses for serving an application and associated sub-applications.

FIG. 7 is a block diagram of an example process 700 for managing requests and responses for serving an application and associated sub-applications. The process 700 can be implemented using a specially configured distributed computing system that performs loads of sub-applications of a primary application. For example, the process 700 can be implemented using the components of FIG. 1, which includes a host server 108, multiple data child servers 110, and resource servers 112. Operations of the process 700 can also be implemented as instructions encoded on a non-transitory computer readable medium. Execution of the instructions by a distributed computing system cause the distributed computing system to perform operations of the process 700.

A page load request is received by a mixer and from a client device for a page that includes a sub-application (702). For example, as discussed above with reference to FIG. 3, the mixer 106 can receive the request 302*a* from the browser 102. The request can be a request to load the UI 200 for the primary application that includes sub-applications associated with the control of UI components 220*a*-220*e*.

The page load request is routed by the mixer to a host server that processes page load requests for pages that include one or more sub-applications (704). For example, as discussed above with reference to FIG. 3, the mixer can route the request 302*a* to the host server 108.

The page load request is processed by the host server (706). The processing includes transmitting, to the client device, a response that includes instructions that redirect the client device to a child server that serves a set of data that initializes the sub-application without providing sufficient code required to render a user interface of the sub-application. The response also includes synchronization code that prevents the client device from initiating a network call for UI code that renders static user interface elements of the sub-application until the client device has initiated one or more network calls to one or more child servers requesting data that will be presented by a given user interface view of the sub-application. For example, as discussed above with reference to FIG. 3, the host server 108 can process the request 302a at step A2, including sending the response 304b to the browser 102. Synchronization code included in the response 304a can include instructions used when initiating requests to child servers 110 and resource servers 112 so that UI components 220a-220e are not rendered until needed responses are received from resource servers 112.

In some implementations, the process 700 further includes receiving, by a given child server, a network call initiated at a client device based on the instructions transmitted by the host server, and transmitting, to the client device, the set of data that initializes the sub-application at the client device without providing sufficient code required to render the user interface of the sub-application. For example, responses 304f, provided by the child server 110 in response to received requests 302d1 and 302d2, do not include resources needed to render associated UI components 220a-220e.

In some implementations, the process 700 further includes receiving, by a resource server, a second network call from the client device, and transmitting, by the resource server and in response to the second network call, a set of code that is combined, at the client device, with the set of data to render the user interface of the sub-application at the client device. For example, rendering of the UI components 220a-220e can occur after response 304g is received from the resource server 112.

Figure 8:
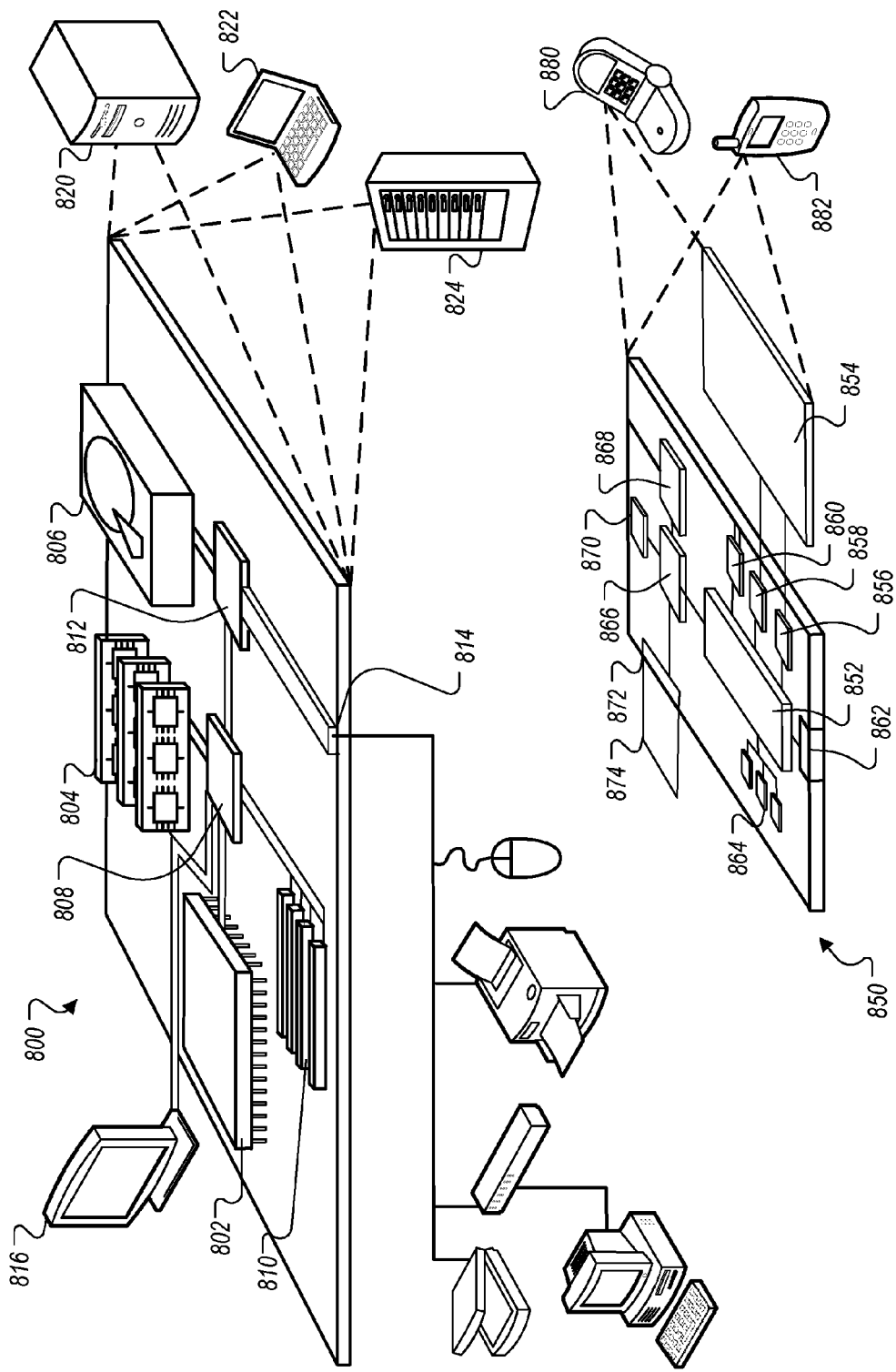
FIG. 8 is a block diagram of computing devices that may be used to implement the systems and methods described in this document.

FIG. 8 is a block diagram of computing devices 800, 850 that may be used to implement the systems and methods described in this document, as either a client or as a server or plurality of servers. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a computer-readable medium. In one implementation, the memory 804 is a volatile memory unit or units. In another implementation, the memory 804 is a non-volatile memory unit or units.

The storage device 806 is capable of providing mass storage for the computing device 800. In one implementation, the storage device 806 is a computer-readable medium. In various different implementations, the storage device 806 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of duties is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can process instructions for execution within the computing device 850, including instructions stored in the memory 864. The processor may also include separate analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD display or an OLED display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provided in communication with processor 852, so as to enable near area communication of device 850 with other devices. External interface 862 may provide, for example, for wired communication (e.g., via a docking procedure) or for wireless communication (e.g., via Bluetooth® or other such technologies).

The memory 864 stores information within the computing device 850. In one implementation, the memory 864 is a computer-readable medium. In one implementation, the memory 864 is a volatile memory unit or units. In another implementation, the memory 864 is a non-volatile memory unit or units. Expansion memory 874 may also be provided and connected to device 850 through expansion interface 872, which may include, for example, a SIMM card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provided as a security module for device 850, and may be programmed with instructions that permit secure use of device 850. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth®, WiFi, or other such transceiver (not shown). In addition, GPS receiver module 870 may provide additional wireless data to device 850, which may be used as appropriate by applications running on device 850.

Device 850 may also communicate audibly using audio codec 860, which may receive spoken information from a user and convert it to usable digital information. Audio codex 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

What is claimed is:

1. A system, comprising:
a plurality of servers comprising one or more processors that each serve a separate sub-application of a primary application that includes two or more of the separate sub-applications, wherein:
the two or more separate sub-applications are combined at a client device to create a single graphical user interface of the primary application;
each of the sub-applications is separately served by the plurality of servers in response to multiple different network calls to multiple different servers that are initiated by the client device executing the primary application, wherein the plurality of servers serve each of the sub-applications without providing sufficient code required to render a user interface of that sub-application; and
synchronization code, served by one or more of the plurality of servers to the client device, delays the client device from initiating a network call for UI code that is required to render a user interface of each sub-application until the client device has initiated one or more networks calls requesting data that will be presented by a given user interface view of each sub-application that is generated using the UI code.

2. The system of claim 1, wherein the plurality of servers comprises:
a host server that processes page load requests for pages that include a sub-application;
a plurality of child servers, each child server serves a set of data that initializes a respective sub-application of the two or more separate sub-applications without providing sufficient code required to render a user interface of the respective sub-application;
a resource server that serves a set of code that is combined with the set of data to render the user interface of each sub-application; and
a mixer that routes network calls from a user device to each of the host server, each child server, and the resource server based on information in the network calls.

3. The system of claim 2, wherein:
the set of data served by each child server does not include code that manipulates a Document Object Model (DOM) of a page that includes each respective sub-application; and
the set of code served by the resource server includes the code that manipulates the DOM of the page.

4. The system of claim 2, wherein in response to a page load request, the host server transmits, to the client device, a first response that includes:
a set-cookie header that includes an identifier of the host server;
a first network path corresponding to each child server;
a second network path corresponding to the resource server; and
the synchronization code.

5. The system of claim 4, wherein the synchronization code instructs the client device to initiate a first network call to the first network path requesting, from each respective child server, one or more components of each respective sub-application.

6. The system of claim 5, wherein in response to the first network call, each respective child server transmits, to the client device, a second response that includes:
a new set-cookie header that includes an identifier of each respective child server, and enables a same child server to be subsequently called by the client device; and
code that triggers a subsequent network call to the resource server requesting, from the resource server, the UI code that renders static user interface elements of the sub-application.

7. The system of claim 6, wherein the synchronization code initiates, using the new set-cookie header, one or more additional network calls to each respective child server requesting one or more sets of data that will be presented by the given user interface view of each respective sub-application, and wherein the synchronization code delays the subsequent network call to the resource server until each of the network calls to each respective child server have been initiated by the client device.

8. The system of claim 7, wherein the synchronization code delays execution of the UI code until responses to the one or more additional network calls have been received by the client device.

9. The system of claim 7, wherein prior to initiation of the one or more additional network calls to each respective child server, each respective child server pre-loads a dataset corresponding to information included in the first network call requesting the one or more components of the sub-application.

10. The system of claim 1, wherein the synchronization code delays the client device from initiating a network call for the UI code only after the client device has initiated all network calls for all data that will be presented by the given user interface view of each sub-application.

11. The system of claim 1, wherein at least one separate sub-application of the two or more separate sub-applications uses a different user interface platform than at least one other separate sub-application.

12. A method, comprising:
receiving, by a mixer and from a client device, a page load request for a page that includes two or more separate sub-applications;
routing, by the mixer, the page load request to a host server that processes page load requests for pages that include two or more separate sub-applications; and
processing, by the host server, the page load request, including:
transmitting, to the client device, a response that includes:
instructions that redirect the client device to a particular child server of a plurality of child servers for each respective sub-application of the two or more separate sub-applications, wherein each respective child server serves a set of data that initializes a particular sub-application of the two or more separate sub-applications without providing sufficient code required to render a user interface of the particular sub-application; and
synchronization code that delays the client device from initiating a network call for UI code that is required to render a user interface of each sub-application until the client device has initiated one or more networks calls requesting data that will be presented by a given user interface view of each sub-application that is generated using the UI code.

13. The method of claim 12, further comprising:
receiving, by a given child server, a network call initiated at a client device based on the instructions transmitted by the host server; and
transmitting, to the client device, the set of data that initializes a respective sub-application of the two or more separate sub-applications at the client device without providing sufficient code required to render the user interface of the respective sub-application.

14. The method of claim 13, further comprising:
receiving, by a resource server, a second network call from the client device; and
transmitting, by the resource server and in response to the second network call, a set of code that is combined, at the client device, with the set of data to render the user interface of each respective sub-application at the client device.

15. The method of claim 14, wherein:
the set of data transmitted by the child server does not include code that manipulates a Document Object Model (DOM) of a page that includes each respective sub-application; and
the set of code transmitted by the resource server includes the code that manipulates the DOM of the page.

16. The method of claim 12, wherein the response transmitted by the host server includes:
a set-cookie header that includes an identifier of the host server;
a first network path corresponding to each respective child server;
a second network path corresponding to a resource server; and
the synchronization code.

17. The method of claim 12, wherein at least one separate sub-application of the two or more separate sub-applications uses a different user interface platform than at least one other separate sub-application.

18. A non-transitory computer storage medium encoded with a computer program, the program comprising instructions that when executed by a distributed computing system cause the distributed computing system to perform operations comprising:
receiving, by a mixer and from a client device, a page load request for a page that includes two or more separate sub-applications;
routing, by the mixer, the page load request to a host server that processes page load requests for pages that include two or more separate sub-applications; and
processing, by the host server, the page load request, including:
transmitting, to the client device, a response that includes:
instructions that redirect the client device to a particular child server of a plurality of child servers for each respective sub-application of the two or more separate sub-applications, wherein each respective child server serves a set of data that initializes a particular sub-application of the two or more separate sub-applications without providing sufficient code required to render a user interface of the particular sub-application; and
synchronization code that delays the client device from initiating a network call for UI code that is required to render a user interface of each sub-application until the client device has initiated one or more networks calls requesting data that will be presented by a given user interface view of each sub-application that is generated using the UI code.

19. The non-transitory computer storage medium of claim 18, the operations further comprising:
receiving, by a given child server, a network call initiated at a client device based on the instructions transmitted by the host server; and
transmitting, to the client device, the set of data that initializes a respective sub-application of the two or more separate sub-applications at the client device without providing sufficient code required to render the user interface of the respective sub-application.

20. The non-transitory computer storage medium of claim 19, the operations further comprising:
receiving, by a resource server, a second network call from the client device; and
transmitting, by the resource server and in response to the second network call, a set of code that is combined, at the client device, with the set of data to render the user interface of each respective sub-application at the client device.

21. The non-transitory computer storage medium of claim 20, wherein:
the set of data transmitted by the child server does not include code that manipulates a Document Object Model (DOM) of a page that includes each respective sub-application; and
the set of code transmitted by the resource server includes the code that manipulates the DOM of the page.

22. The non-transitory computer storage medium of claim 18, wherein the response transmitted by the host server includes:
a set-cookie header that includes an identifier of the host server;
a first network path corresponding to each respective child server;
a second network path corresponding to a resource server; and
the synchronization code.

23. The non-transitory computer storage medium of claim 18, wherein at least one separate sub-application of the two or more separate sub-applications uses a different user interface platform than at least one other separate sub-application.

* * * * *

UNITED STATES PATENT AND TRADEMARK OFFICE
CERTIFICATE OF CORRECTION

| | | |
|---|---|---|
| PATENT NO. | : 10,382,518 B2 | Page 1 of 1 |
| APPLICATION NO. | : 15/236804 | |
| DATED | : August 13, 2019 | |
| INVENTOR(S) | : Neagu et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 253 days.

Signed and Sealed this
Second Day of June, 2020

Andrei Iancu
*Director of the United States Patent and Trademark Office*